(12) United States Patent
Zhai et al.

(10) Patent No.: US 11,165,197 B2
(45) Date of Patent: Nov. 2, 2021

(54) CONNECTOR RELEASE ASSIST SYSTEM

(71) Applicant: Dell Products L.P., Round Rock, TX (US)

(72) Inventors: Haifang Zhai, Shanghai (CN); Wei Dong, Shanghai (CN); Fajiang Liu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/778,972

(22) Filed: Jan. 31, 2020

(65) Prior Publication Data

US 2021/0036462 A1 Feb. 4, 2021

(30) Foreign Application Priority Data

Jul. 30, 2019 (CN) .......................... 201910692321.5

(51) Int. Cl.
*H01R 13/627* (2006.01)
*H01R 24/62* (2011.01)
*H01R 13/629* (2006.01)
*H01R 13/633* (2006.01)

(52) U.S. Cl.
CPC ......... *H01R 13/6272* (2013.01); *H01R 24/62* (2013.01); *H01R 13/629* (2013.01); *H01R 13/633* (2013.01)

(58) Field of Classification Search
CPC .............. H01R 13/6272; H01R 13/629; H01R 13/62933; H01R 13/633; H01R 13/635
See application file for complete search history.

(56) References Cited

U.S. PATENT DOCUMENTS

| | | | |
|---|---|---|---|
| 6,238,251 B1 * | 5/2001 | Curtis | H01R 13/62933 439/344 |
| 6,332,798 B1 * | 12/2001 | Farooq | H01R 13/633 439/344 |
| 6,702,475 B1 * | 3/2004 | Giobbio | G02B 6/3825 385/53 |
| 7,517,241 B2 * | 4/2009 | Gundlach | H01R 13/6335 439/344 |
| 2005/0075001 A1 * | 4/2005 | Shearman | H01R 13/6335 439/352 |

* cited by examiner

*Primary Examiner* — Renee S Luebke
*Assistant Examiner* — Paul D Baillargeon
(74) *Attorney, Agent, or Firm* — Joseph Mencher

(57) ABSTRACT

A connector release assist system includes a first connector that has at least one first connector securing feature that is configured to engage a second connector to secure the second connector to the first connector, and disengage the second connector when a second connector release member on the second connector is actuated. A subsystem is located adjacent the first connector such that the subsystem inhibits access to the second connector release member when the second connector is secured to the first connector. A connector release assist device is located adjacent the first connector, extends past the subsystem, and is configured to actuate the second connector release member. In specific examples, the first connector is an RJ-45 female connector, and the second connector is an RJ-45 male connector.

17 Claims, 12 Drawing Sheets

CONNECTOR RELEASE ASSIST SYSTEM

CROSS-REFERENCE TO RELATED APPLICATIONS

This application claims priority to Chinese Application Serial No. 201910692321.5, filed Jul. 30, 2019, the disclosure of which is incorporated herein by reference in its entirety.

BACKGROUND

The present disclosure relates generally to information handling systems, and more particularly to assisting the release of connectors connected to an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, networking devices, storage devices, and/or other computing devices known in the art, generally include a variety of connectors for connecting to other devices. For example, computing devices often include networking connectors (e.g., RJ-45 female connectors) that are configured to connect to networking cables (e.g., via RJ-45 male connectors on those cables). As will be appreciated by one of skill in the art, the RJ-45 male and female connectors described above include securing features for securing the RJ-45 male connector in the RJ-45 female connector when the RJ-45 male connector is positioned in the RJ-45 female connector, and the RJ-45 male connectors often include connector release members that may be actuated to release the RJ-45 male connector from the securing features so that it may be removed from the RJ-45 female connector. However, as the component density in computing devices increases and those computing devices reduce in size, the networking connectors on the computing device may be positioned closer and closer to other features on the chassis of the computing device. For example, computing device latches that are configured to secure the computing device to a rack may be positioned immediately adjacent the networking connectors on the computing device, which can introduce mechanical interference with the operation of those networking connectors. For example, when the RJ-45 male connector is positioned in and secured to the RJ-45 female connector as discussed above, a computing device latch located immediately adjacent that RJ-45 female connector can inhibit access to the release member on the RJ-45 male connector secured thereto, and make it difficult for a user to release the RJ-45 male connector from the securing features so that it may be removed from the RJ-45 female connector.

Accordingly, it would be desirable to provide an improved connector release system.

SUMMARY

According to one embodiment, an Information Handling System (IHS) includes a chassis; a processing system that is included in the chassis; a first connector that is included on the chassis and coupled to the processing system, wherein the first connector has at least one first connector securing feature that is configured to: engage a second connector to secure the second connector to the first connector; and disengage the second connector when a second connector release member on the second connector is actuated; a chassis subsystem that extends from the chassis adjacent the first connector such that the chassis subsystem inhibits access to the second connector release member when the second connector is secured to the first connector; and a connector release assist device that is located on the chassis adjacent the first connector and that extends past the chassis subsystem, wherein the connector release assist device is configured to actuate the second connector release member.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
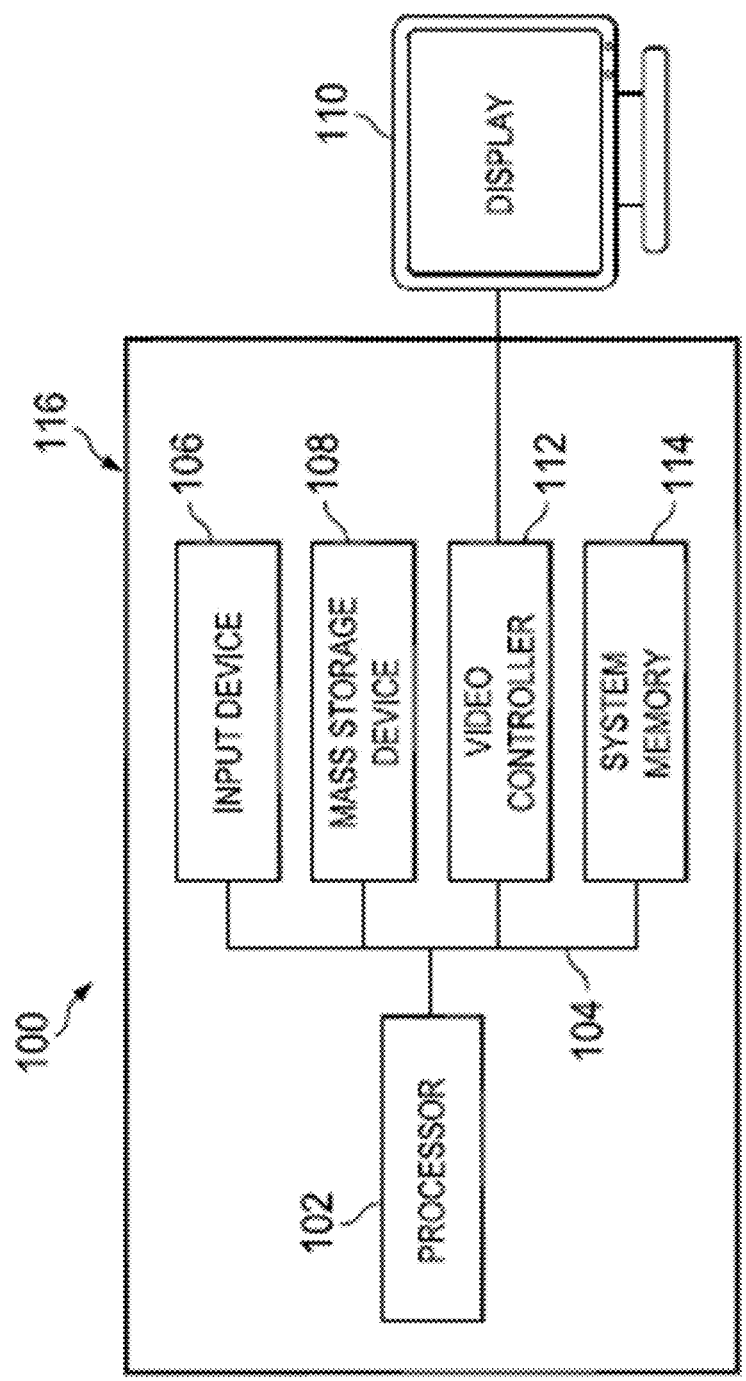
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
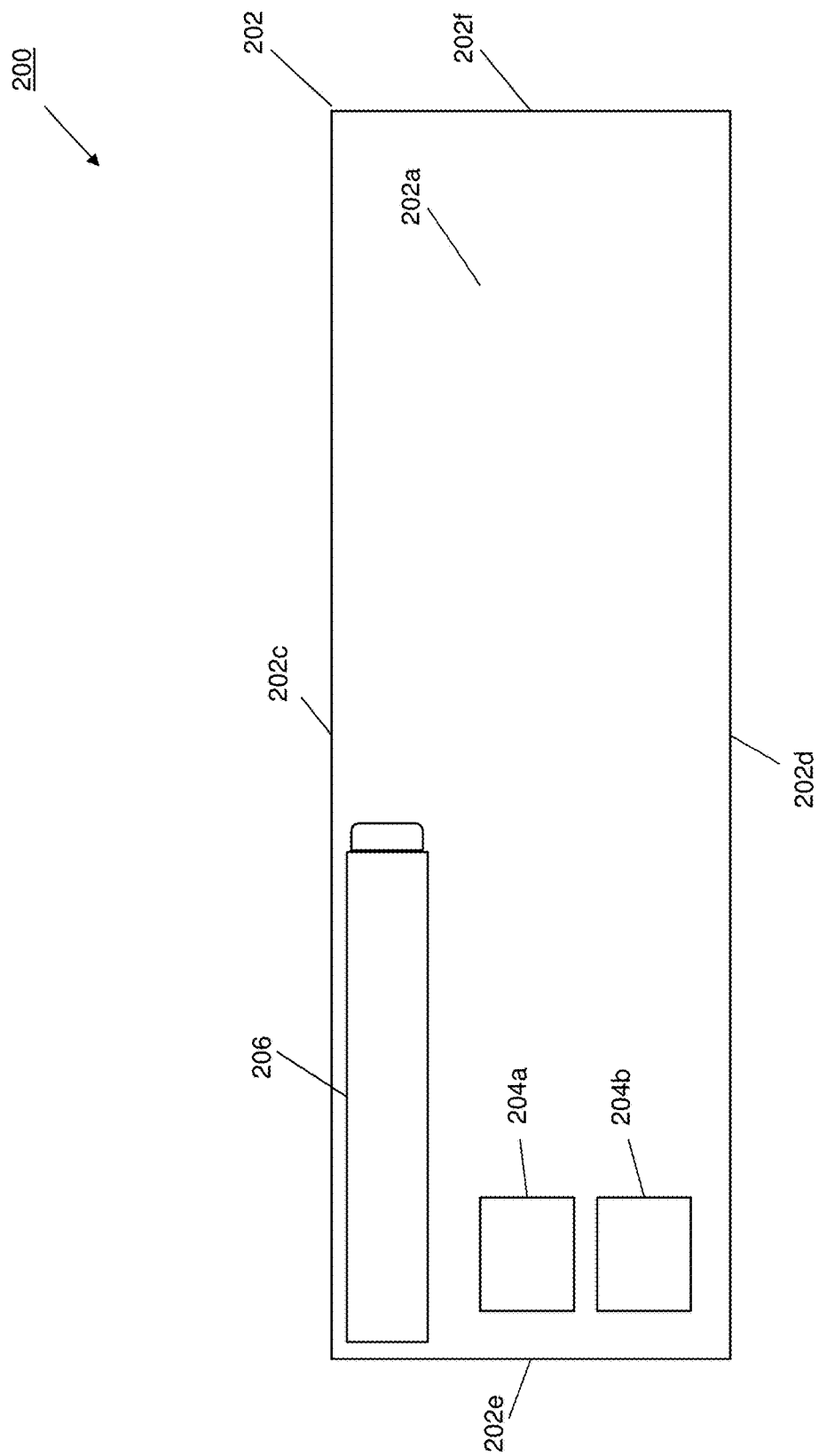
FIG. 2A is a schematic front view illustrating an embodiment of a conventional computing device.
Figure 2B:
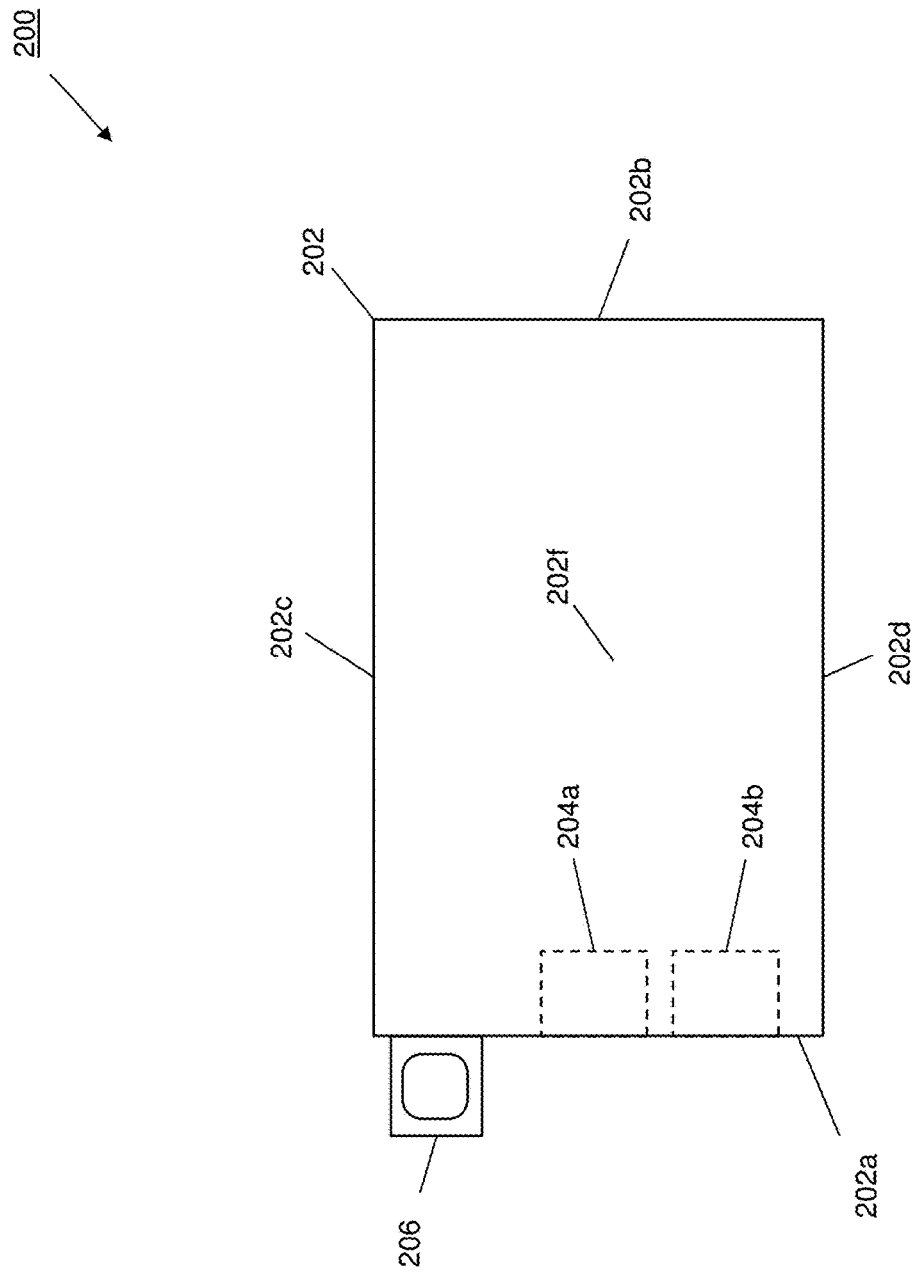
FIG. 2B is a schematic side view illustrating an embodiment of the conventional computing device of FIG. 2A.

Referring now to FIGS. 2A and 2B, an embodiment of a conventional computing device 200 is illustrated. In an embodiment, the conventional computing device 200 may be provided by the IHS 100 discussed above with reference to FIG. 1, and/or may include some or all of the components of the IHS 100. However, while illustrated and discussed as a server device, one of skill in the art in possession of the present disclosure will recognize that conventional computing device 200 may be provided by storage systems, networking systems, desktop computing devices, and/or any other computing devices that experience the same issues as the conventional computing device 200 discussed below. In the illustrated embodiment, the conventional computing device 200 includes a computing device chassis 202 that has a front wall 202a, a rear wall 202b that is located opposite the chassis 202 from the front wall 202a, a top wall 202c that extends between the front wall 202a and the rear wall 202b, a bottom wall 202d that is located opposite the chassis 202 from the top wall 202c and that extends between the front wall 202a and the rear wall 202b, and a pair of opposing side walls 202e and 202f that are located opposite the chassis 202 from each other and that extend between the front wall 202a, the rear wall 202b, the top wall 202c, and the bottom wall 202d. As will be appreciated by one of skill in the art in possession of the present disclosure, the chassis 202 may define a housing between the front wall 202a, the rear wall 202b, the top wall 202c, the bottom wall 202d, and the pair of opposing side walls 202e and 202f, and that housing may house any computing device components such as, for example, the IHS components discussed above with reference to FIG. 1.

In the illustrated embodiment, the chassis 202 includes a plurality of connectors 204a and 204b that are located adjacent each other and that extend into the front wall 202a of the chassis 202. As will be appreciated by one of skill in the art in possession of the present disclosure, the connectors 204a and 204b may be coupled to any of a variety of computing device components that are housed in the chassis 202, and the details of those couplings are not described herein in detail. In the examples provided below, the connectors 204a and 204b are provided by networking connectors such as the RJ-45 female connectors discussed hererin, but one of skill in the art in possession of the present disclosure will recognize that the connectors 204a and 204b may be provided by any connectors types (e.g., the networking connectors types discussed below, storage connector types, Input/Output (I/O) connector types, etc.) and/or configurations (e.g., male or female) while remaining within the scope of the present disclosure as well. Furthermore, one of skill in the art in possession of the present disclosure will recognize that connectors 204a and 204b provided on the chassis 202 may be provided at any location (e.g., on any wall of the chassis 202, internal to/housed in the chassis 202, etc.) and/or on any other system while remaining within the scope of the present disclosure as well.

In the illustrated embodiment, the chassis 202 also includes a chassis subsystem 206 that is located adjacent the connector 204a and that, in the examples below, is provided by a computing device latch that one of skill in the art in possession of the present disclosure will recognize may be configured to secure and release the computing device 200 to and from a rack or other computing device chassis. However, while illustrated and described as a computing device latch, one of skill in the art in possession of the present disclosure will recognize that the computing device latch may be replaced by any subsystem that is located adjacent the connector 204a in the manner that inhibits access to a connector release member on another connector when that other connector is engaged with the connector 204a, discussed in further detail below. As such, while specific features of the conventional computing device 200 are illustrated, one of skill in the art in possession of the present disclosure will recognize that the teachings of the present disclosure are intended to improve the connector release functionality for any system that includes a subsystem positioned adjacent a connector in a manner that inhibits access to a connector release member associated with that connector, and such systems will benefit from the teachings of the present disclosure and thus are envisioned as falling within its scope as well.

Figure 3:
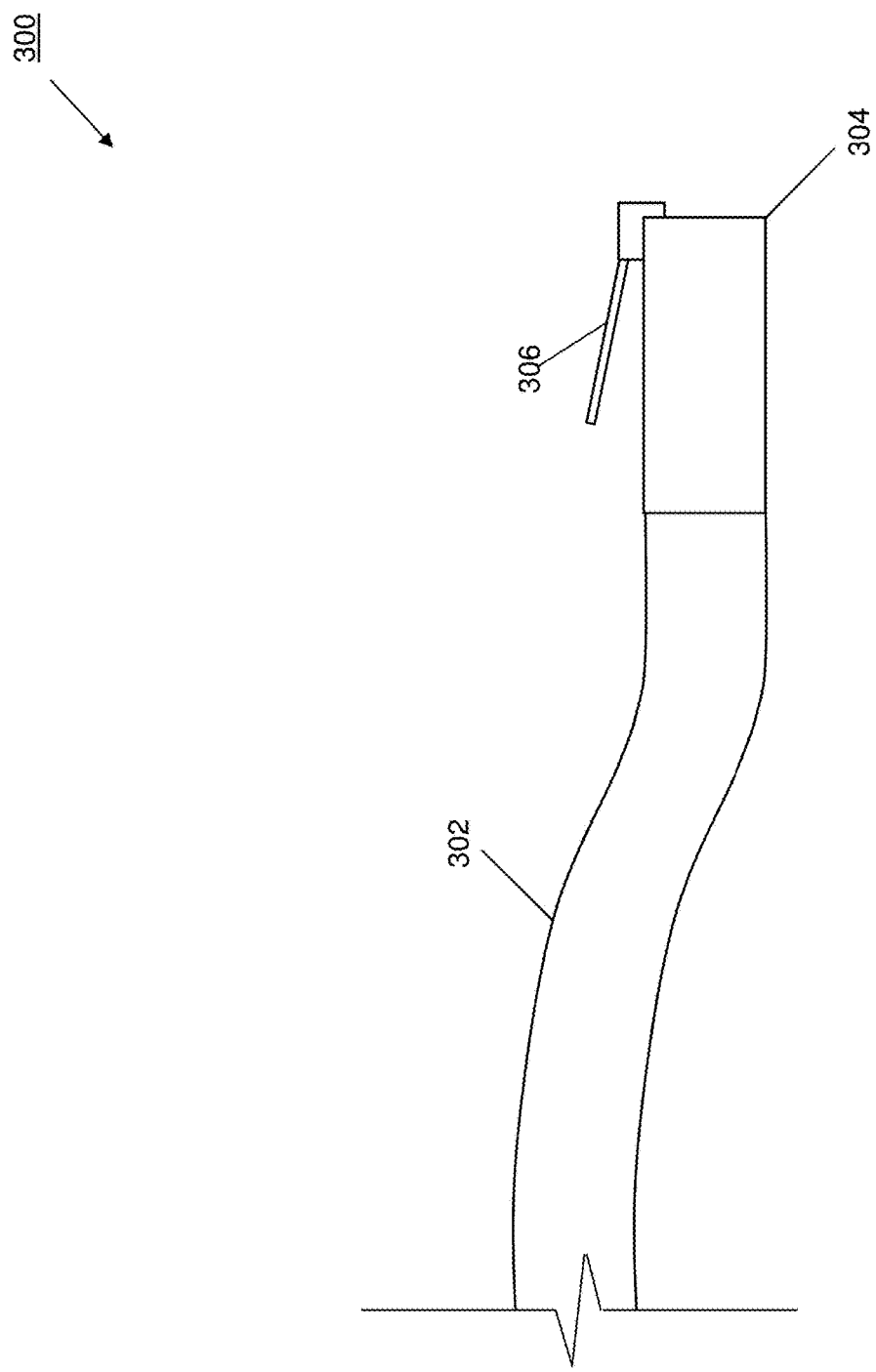
FIG. 3 is a schematic side view illustrating an embodiment of a cable with a connector.

Referring now to FIG. 3, an embodiment of a cable 300 is illustrated that includes cabling 302 having a connector 304 that is provided on a distal end of the cabling 302 and that includes a connector release member 306. One of skill in the art in possession of the present disclosure will recognize that the cable 300 illustrated in FIG. 3 is a networking cable that may be provided by an RJ-45 cable with an RJ-45 male connector having an RJ-45 connector release member. For example, the cabling 302 on the cable 300 may include another connector that is substantially similar opt the connector 304, but provided on a distal end of the cabling 302 that is opposite the connector 304, and that connector may be coupled to a device, which allows the connector 304 to be coupled to a computing device as discussed below to enable communications between the two. However, one of skill in the art in possession of the present disclosure will also recognize that other types of connectors may be provided on other types of cables and/or devices while remaining within the scope of the present disclosure as well. Furthermore, while the connector release member 306 is illustrated as included on the connector 304 in a manner that results in access to the connector release member 306 being inhibited by a subsystem when the connector 304 is coupled to a computing device, connector release members to which access is inhibited according to the teachings of the present disclosure may be provided in a variety of locations that would be apparent to one of skill in the art in possession of the present disclosure. As such, while a specific cable 300 is illustrated to provide an example of a connector and connector release member, the connector and/or connector release member of the present disclosure may be provided in a variety of configurations that will fall within the scope of the present disclosure as well.

Figure 4A:
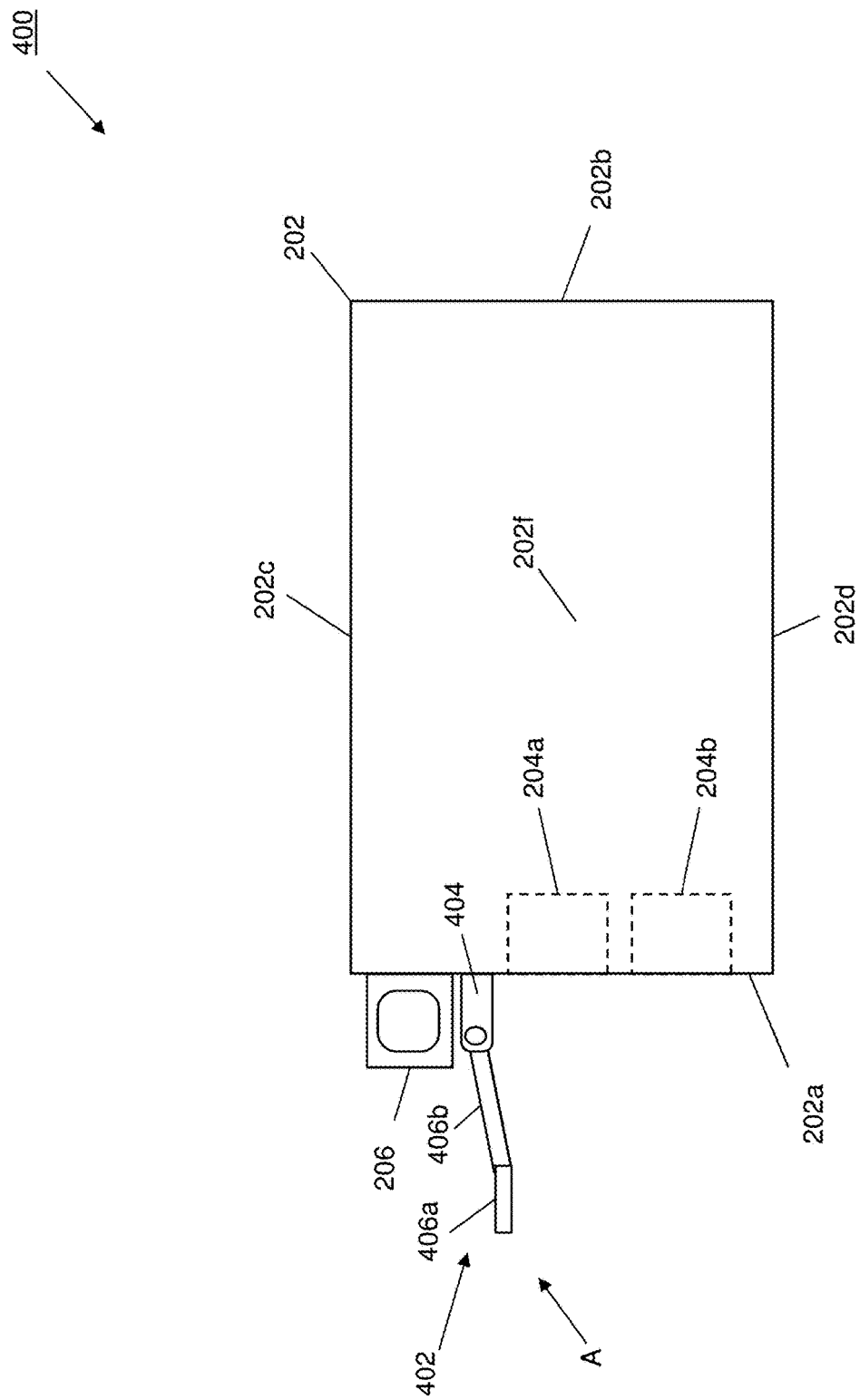
FIG. 4A is a schematic side view illustrating an embodiment of a computing device having the connector release assist system of the present disclosure.
Figure 4B:
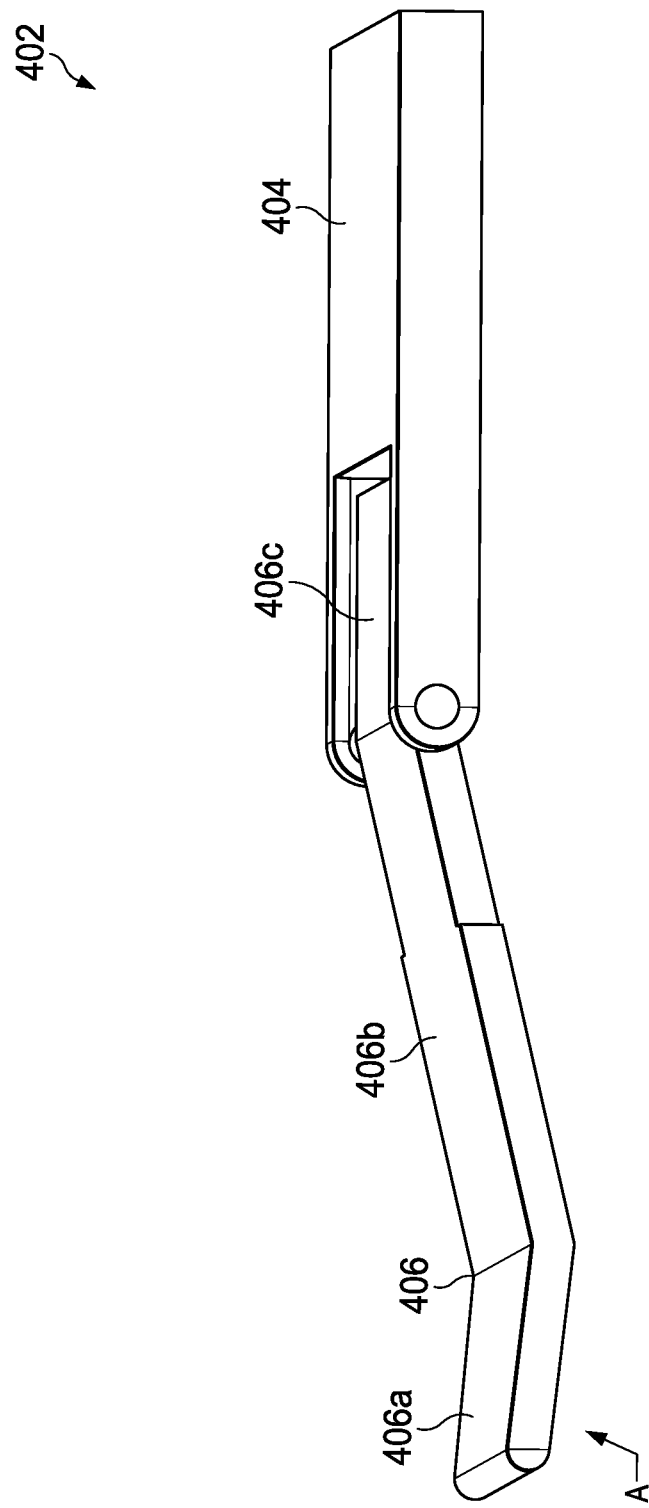
FIG. 4B is a perspective view illustrating an embodiment of a connector release assist device of the present disclosure that may be provided on the computing device of FIG. 4A.
Figure 4C:
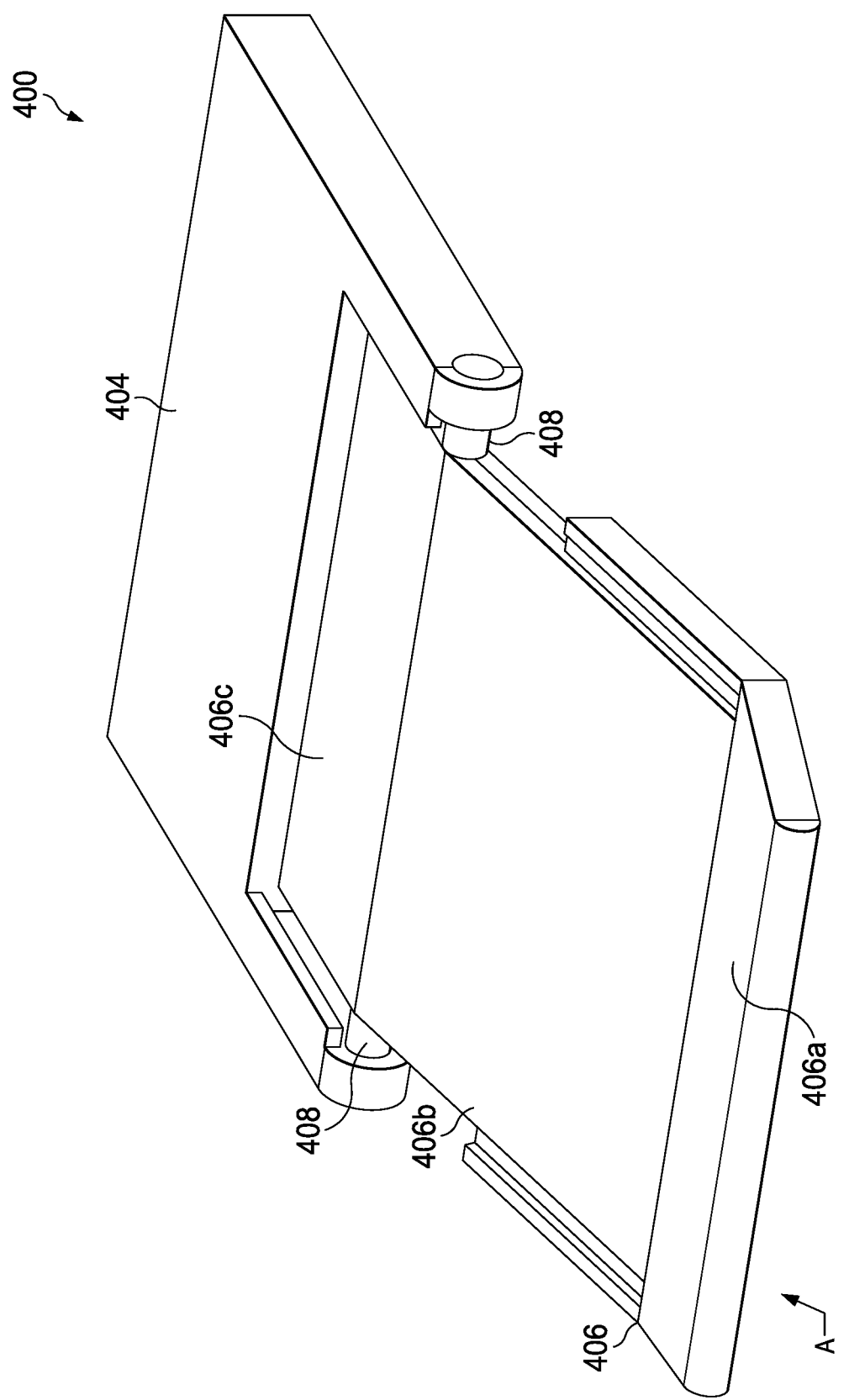
FIG. 4C is a perspective view illustrating an embodiment of the connector release assist device of the present disclosure that may be provided on the computing device of FIG. 4A.

Referring now to FIGS. 4A, 4B, and 4C, a computing device 400 is illustrated that implements an embodiment of the connector release assist system of the present disclosure. In the illustrated embodiment, the computing device 400 includes features that are similar to the conventional computing device 200 discussed above with reference to FIGS. 2A and 2B, and thus includes similar reference numbers to identify the chassis 202, the connectors 204a and 204b, and the chassis subsystem 206. However, one of skill in the art in possession of the present disclosure will recognize that the computing device 400 is illustrated and described as similar to the conventional computing device 200 for purposes of illustrating some benefits of the connector release assist system of the present disclosure, and that other computing devices that are different than the conventional computing device 200 may implement the connector release assist system of the present disclosure while remaining within the scope of the present disclosure as well.

In the illustrated embodiment, a connector release assist device 402 is provided on the chassis 202 and includes a connector release assist base 404 that extends from the front wall 202a of the chassis between the connector 204a and the chassis subsystem 206. However, while illustrated and described as extending from the front wall 202a of the chassis 202 between the between the connector 204a and the chassis subsystem 206, one of skill in the art in possession of the present disclosure will recognize that a connector release assist device provided according to the teachings of the present disclosure may be provided in a variety of locations relative to the connector(s) of the present disclosure and based on the locations and/or orientation of the connector release member of the present disclosure in order to provide the connector release assist functionality described below. In the illustrated embodiment, the connector release assist device 402 also includes a connector release assist actuator 406 that is movably coupled to the connector release assist base 404 which, in the embodiment illustrated in FIGS. 4A-4B, and 4C, is provided by a rotatable coupling that allows the connector release assist actuator 406 to rotate about its coupling to the connector release assist base 404. In the illustrated embodiment, the connector release assist device 402 includes resilient members 408 (e.g., springs) engaging the connector release assist base 404 and the connector release assist actuator 406 to resiliently bias the connector release assist actuator 406 into a first orientation A that is illustrated in FIGS. 4A, 4B, and 4C. However, one of skill in the art in possession of the present disclosure will recognize that the connector release assist actuator 406 may be coupled to the connector release assist base 404 in a variety of manners that will enable the functionality below while remaining within the scope of the present disclosure as well.

In the specific examples provided below, the connector release assist actuator 406 includes a user engagement portion 406a that is connected by an elongated extender portion 406b to a connector release member engagement portion 406c, with the user engagement portion 406a orientated at an angle of less than 180 degrees with respect to the elongated extender portion 406b (when viewed from a side profile as illustrated in FIG. 4A), and the connector release member engagement portion 406c orientated an at angle of greater than 180 degrees with respect to the elongated extender portion 406b (when viewed from a side profile like that illustrated in FIG. 4A). As can be seen in FIGS. 4A, 4B, and 4C, the resilient biasing of the connector release assist actuator 406 into the first orientation A provides the connector release member engagement portion 406b located substantially within the connector release assist base 404. However, one of skill in the art in possession of the present disclosure will recognize that the configuration of the connector release assist actuator 406 may be modified based on the location, orientation, functionality, and/or other details of the connector release member discussed below.

Figure 5:
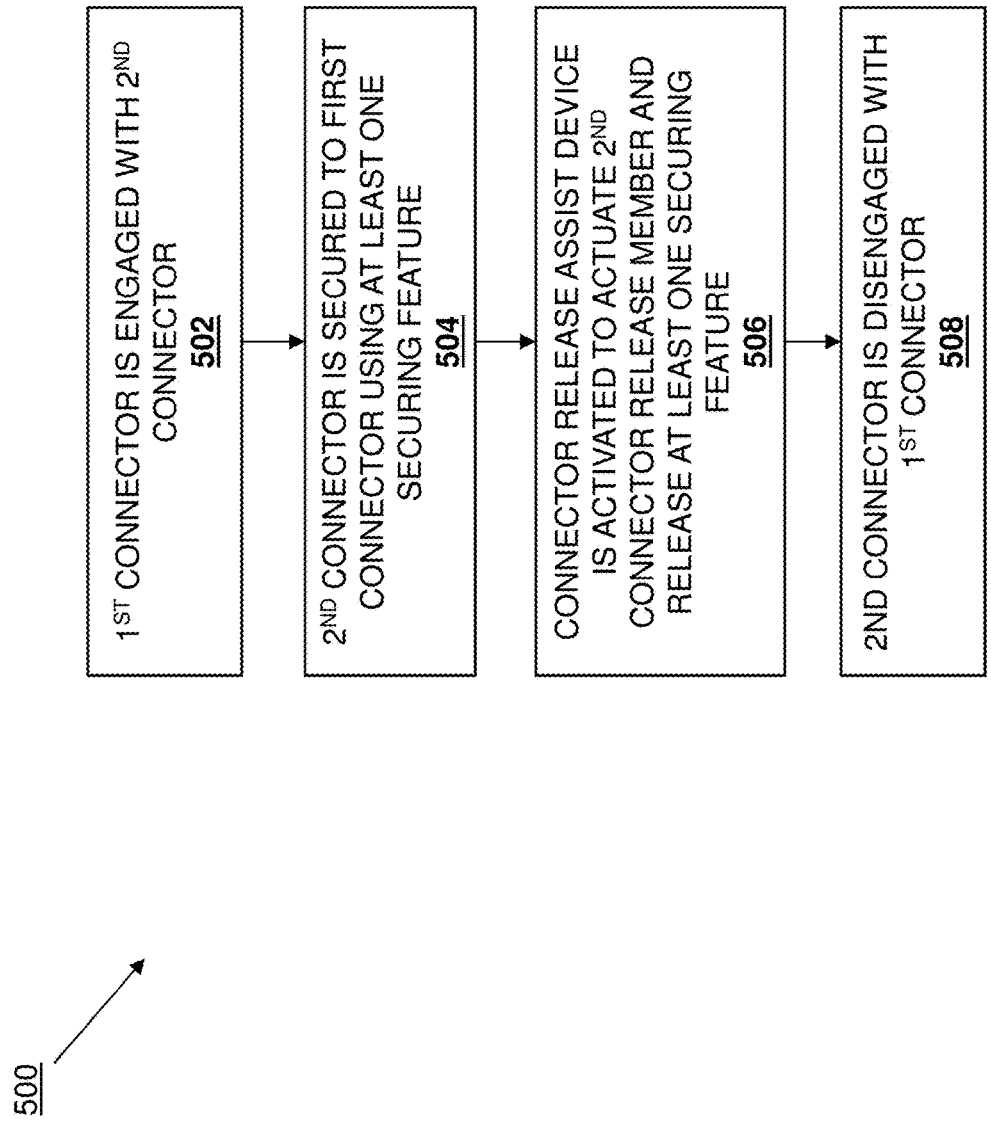
FIG. 5 is a flow chart illustrating an embodiment of a method for assisting the release of a connector.

Referring now to FIG. 5, an embodiment of a method 500 for assisting the release of a connector is illustrated. As discussed below, the systems and methods of the present disclosure provide a connector release assist device that assists in actuating a connector release member on a connector when direct access to that connector release member by a user is inhibited by a subsystem. For example, a chassis subsystem on a chassis may be located adjacent an RJ-45 female connector on the chassis in a manner that inhibits access to a connector release member on an RJ-45 male connector when that RJ-45 male connector is connected to and secured in the RJ-45 female connector. In such situations, the connector release assist device may be provided on the chassis such that a user engagement portion of a connector release assist actuator is accessible to a user, with a user-provided force on that user engagement portion activating the connector release assist device and move a connector release member engagement portion of the connector release assist actuator into engagement with the connector release member to actuate the connector release member and disengage at least one securing feature that secures the RJ-45 male connector to the RJ-45 female connector. The disengagement of the at least one securing feature allows the RJ-45 male connector to be disengaged with the RJ-45 female connector. As such, chassis that includes chassis subsystems that inhibit access to connector features may be provided with the connector feature assist device of the present disclosure in order to allow a user the ability to utilize that connector feature easily and quickly.

Figure 6:
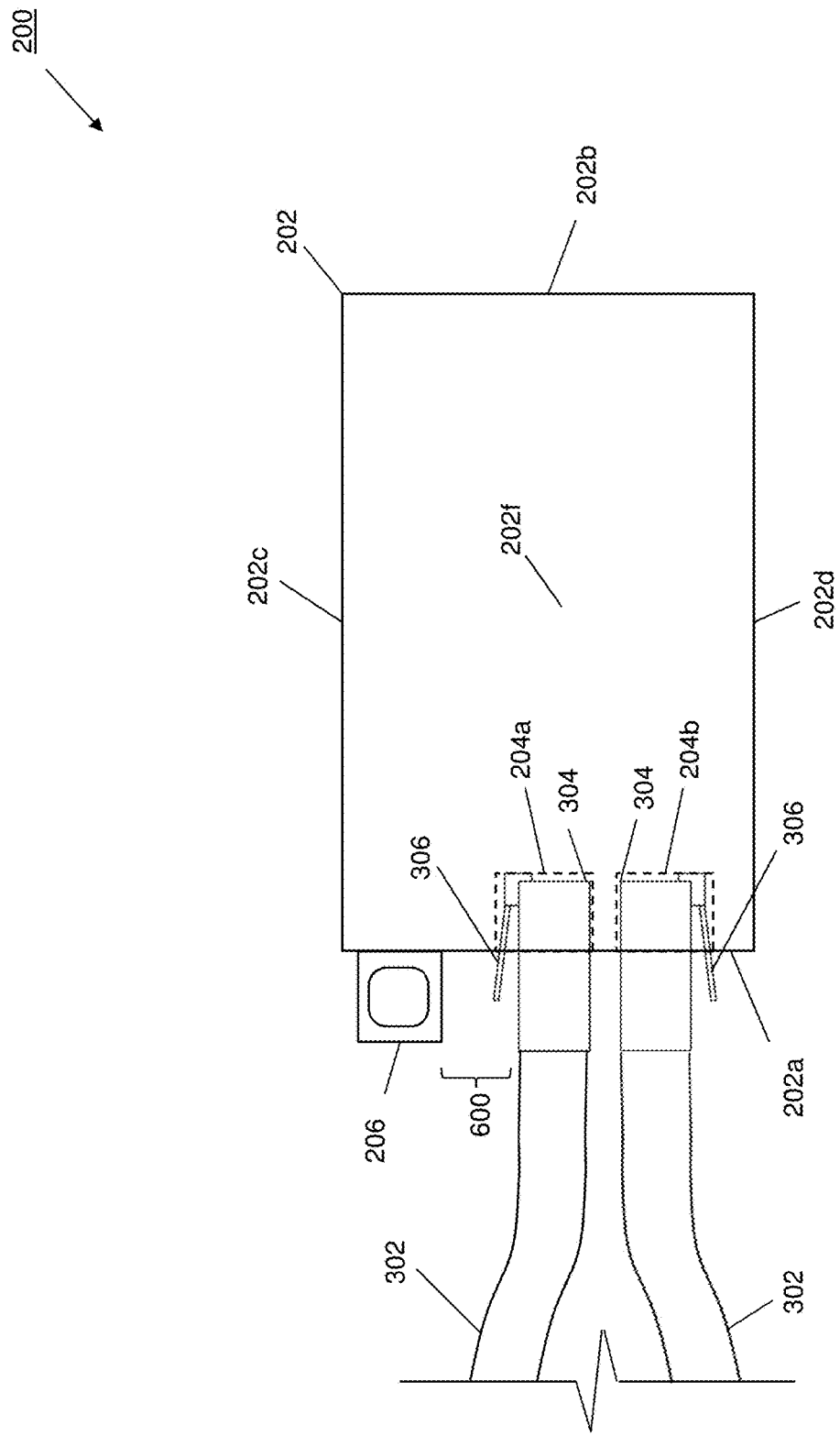
FIG. 6 is a schematic side view illustrating an embodiment of the cable of FIG. 3 coupled to the conventional computing device of FIGS. 2A and 2B.

With reference to FIG. 6, an embodiment of the cables 300 of FIG. 3 utilized with the conventional computing device 200 of FIGS. 2A and 2B is illustrated. As can be seen, a cable 300 may be coupled to the connector 204a on the computing device 200 by, for example, moving the connector 304 on that cable 300 into the connector 204a. As will be appreciated by one of skill in the art in possession of the present disclosure, the moving of the connector 304 on the cable 300 into the connector 204a on the computing device 200 causes securing feature(s) on the connector(s) 304 and/or 204a to secure the connectors 304 and 204a to each other. Similarly, a cable 300 may be coupled to the connector 204b on the computing device 200 by, for example, moving the connector 304 on that cable 300 into the connector 204b on the computing device 200, and securing those connectors 304 and 204b to each other using securing feature(s). FIG. 6 illustrates how, with the connectors 304 and 204a secured to each other, the chassis subsystem 206 extends over the connector 304 and is separated from the connector 304 by a distance 600 that can inhibit access to the connector release member 306 on that connector 304.

As will be appreciated by one of skill in the art in possession of the present disclosure, the configuration of the chassis subsystem 206 and the connector 304 illustrated in FIG. 6 is provided as an example only, and the distance 600 may vary depending on details of the actual configuration of the chassis subsystem 206 and the connector 304. However, one of skill in the art in possession of the present disclosure will recognize that the distance 600 may often reduce to a point that access to the connector release member 306 by a user is inhibited in a manner that may prevent a user from accessing that connector release member 306 to allow the connector 304 to be disengaged from the connector 204a, or make it very difficult to do so (e.g., a user may have difficulty getting their finger in between the chassis subsystem 206 and the connector 304 to actuate the connector release member 306.) In such situations, a user may be required to move the chassis subsystem 206 (e.g., unlatch the computing device from a rack) to access the connector release member 306, use a tool to access the connector release member 306, and/or perform other time consuming operations that lead to an undesirable user experience.

Figure 7A:
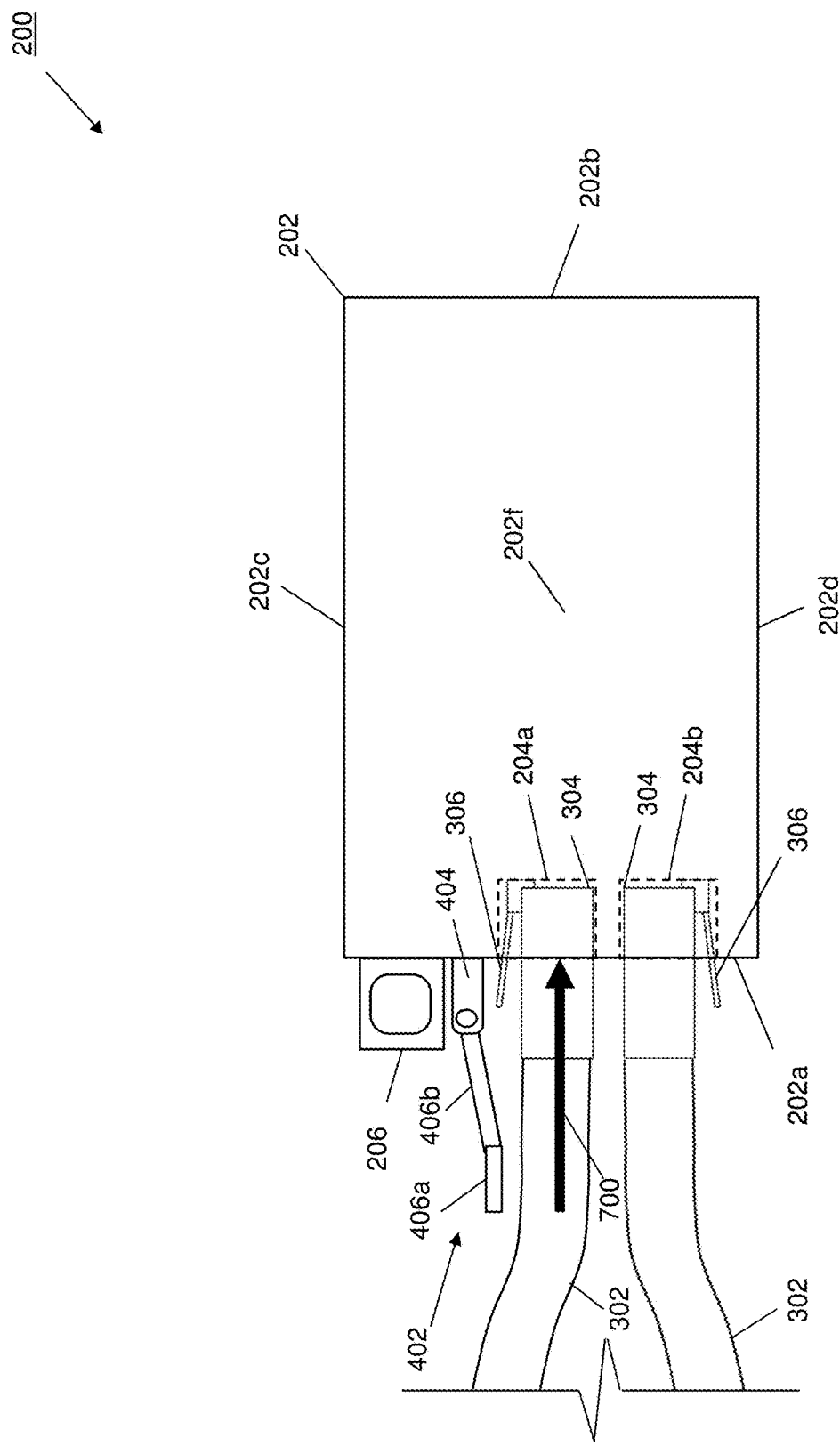
FIG. 7A is a schematic side view illustrating an embodiment of the cable of FIG. 3 coupled to the computing device of FIG. 4A that includes the connector release assist device of FIGS. 4B and 4C.

The method 500 begins at block 502 where a first connector is engaged with a second connector. With reference to FIG. 7A, in an embodiment of block 502, a cable 300 may be provided adjacent the computing device 200 such that the connector 304 on that cable 300 is located adjacent the connector 204a on the computing device 200. That cable 300/connector 204a may then be moved in a direction 700 to cause the connector 304 on the cable 300 to engage the connector 204a on the computing device 200. For example, in the case of RJ-45 connectors, the connector 304 may be an RJ-45 male connector that engages the connector 204a provided by an RJ-45 female connector by moving into that RJ-45 female connector. As will be appreciated by one of skill in the art in possession of the present disclosure, the connectors 304 and 204a may include various alignment and guiding features such that the engagement of the connectors at block 502 aligns electrical connections and securing features included on each of those connectors 304 and 204a. However, while a specific example has been provided, one of skill in the art in possession of the present disclosure will recognize that a variety of different types of connectors may be engaged using a variety of techniques that will fall within the scope of the present disclosure as well.

The method 500 then proceeds to block 504 where the second connector is secured to the first connector using at least one securing feature. In an embodiment, at block 504, the continued engagement of the connectors 304 and 204a following block 502 may result in the engagement of one or more securing features on the connectors 304 and 204a that cause the connector 304 to be secured to the connector 204a. Continuing with the specific example provided above directed to RJ-45 connectors, as the connector 304 provided by an RJ-45 male connector moves into the RJ-45 female connector that provides the connector 204a, at least one securing feature on the RJ-45 female connector engages at least one securing feature on the RJ-45 male connector to secure the RJ-45 male connector in the RJ-45 female connector. As discussed above, the securing of the connectors 304 and 204a in the example illustrated in FIG. 7A (e.g., the securing of an RJ-45 male connector in an RJ-45 female connector that is adjacent the chassis subsystem 206) produces a situation where access to the connector release member 306 on the connector 304 by a user is inhibited by the chassis subsystem 206.

As will be appreciated by one of skill in the art in possession of the present disclosure, the connector release assist device 402 may be configured in a variety of manners that allows for access of the connector 304 on the cable 300 to the connector 204a on the computing device 200, including the ability of that connector 304 to move unobstructed to the connector 204a, engage the connector 204a, and be secured to the connector 204a by a user. For example, the resilient members (e.g., springs) engaging the connector release assist base 404 and the connector release assist actuator 406 may operate to resiliently bias the connector release assist actuator 406 into the first orientation A that prevents the connector release assist actuator 406 from interfering with the engagement and securing of the connector 304 on the cable 300 to the connector 204a on the computing device 200, and prevents the actuation of the connector release member 306 on the connector 304 absent the application of an outside force on the connector release assist actuator 406 (discussed below). As such, following the securing of the connector 304 to the connector 204a at block 204a, the components in the computing device 200 (e.g., the IHS components discussed above with reference to FIG. 1) may transmit data via the cable 300 to any device connected thereto.

The method 500 then proceeds to block 506 where a connector release assist device is activated to actuate a second connector release member and release at least one securing feature. In an embodiment, at block 506, a user may wish to disconnect the cable 300 from the connector 204a on the computing device 200. However, as discussed above, direct access by the user to the connector release member 306 on the connector 304 is inhibited by the chassis subsystem 206, and may require that the user move the chassis subsystem 206 to access the connector release member 306 (e.g., unlatch the chassis 202 of the computing device 200 from a rack), use a tool to access the connector release member 306, and/or perform other time consuming operations that lead to an undesirable user experience. However, at block 506, the user may activate the connector release assist device 402 in order to actuate the connector release member 306 on the connector 304.

Figure 7B:
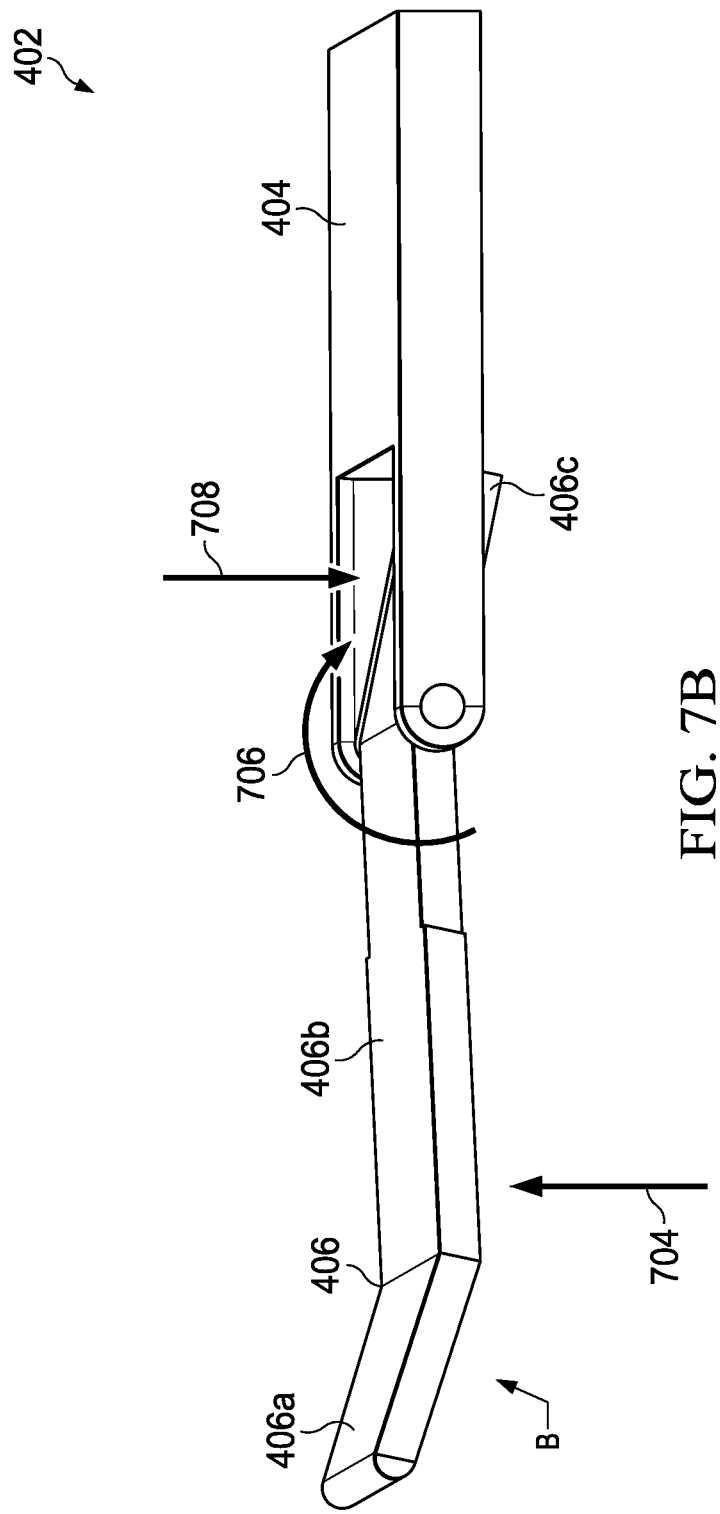
FIG. 7B is a perspective view illustrating an embodiment of the connector release assist device of FIGS. 4B and 4C operating during the method of FIG. 5.
Figure 7C:
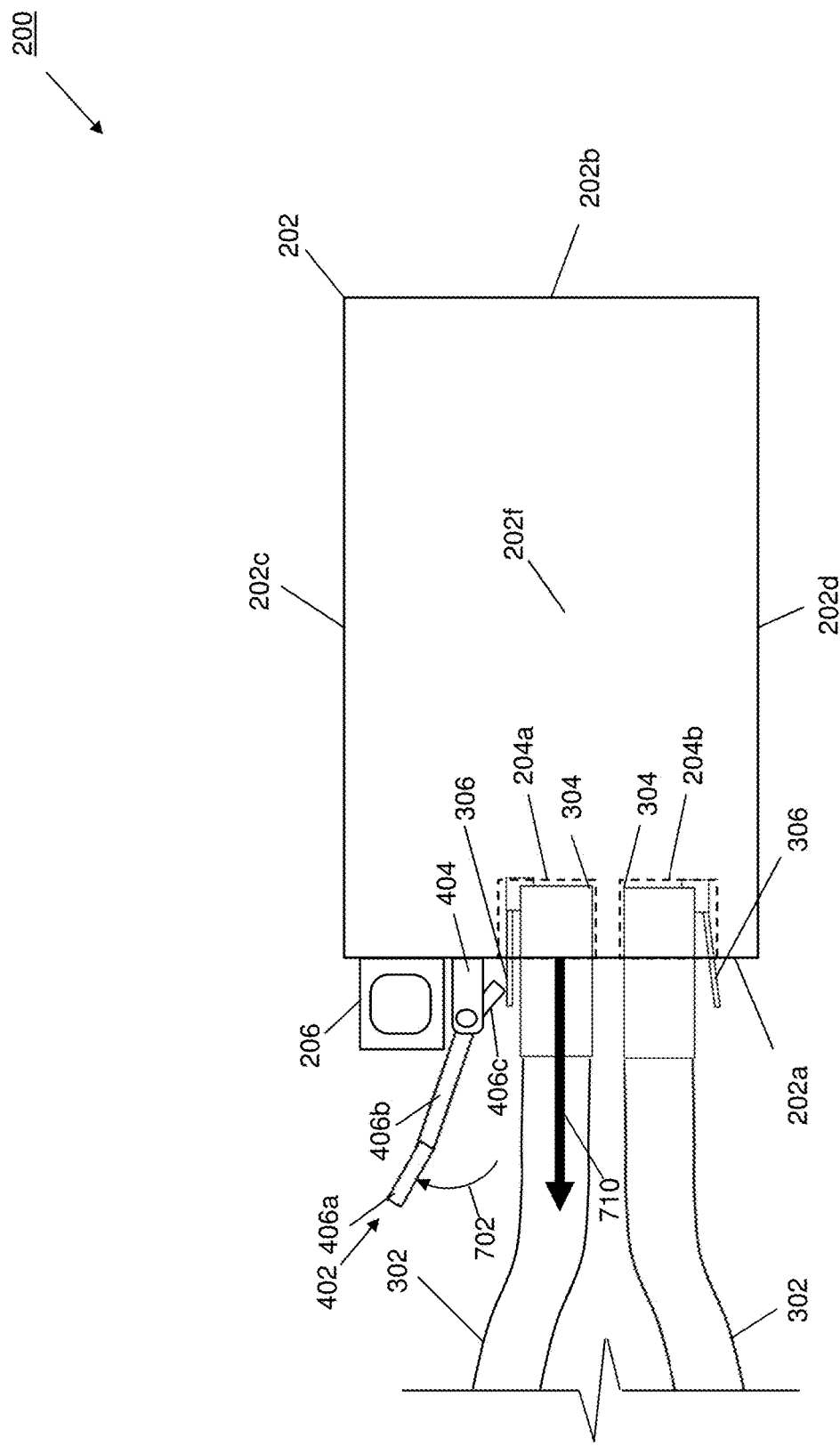
FIG. 7C is a schematic side view illustrating an embodiment of the connector release assist device of FIGS. 4B and 4C on the computing deices of FIG. 4A and operating during the method of FIG. 5

For example, as illustrated in FIGS. 7B and 7C, the user may apply a force 702 on the user engagement portion 406a of the connector release assist actuator 406 that causes the user engagement portion 406a and the elongated extender portion 406b of the connector release assist actuator 706 to move in a direction 704, while also producing a rotation of the connector release assist actuator 406 about its movable coupling to the connector release assist base 404 in a direction 706, which causes the connector release member engagement portion 406c to move in a direction 708 such that the connector release assist actuator 406 is provided in a second orientation B. As illustrated in FIG. 7C, movement of the connector release assist actuator 406 into the second orientation B causes the connector release member engagement portion 406c of the connector release assist actuator 406 to engage the connector release member 306 on the connector 304, which one of skill in the art in possession of the present disclosure will recognize provides for the disengagement of the connector 304 (e.g., securing feature(s) on that connector 304) and securing feature(s) on the connector 204a on the computing device 200.

The method 500 then proceeds to block 508 where the second connector is disengaged from the first connector. In an embodiment, at block 508 and following the disengagement of the connector 304 and securing feature(s) on the connector 204a on the computing device 200, the user may move the cable 300 in a direction 710 to disengage the connector 304 on the cable 300 from the connector 204a on the computing device 200. Continuing with the specific example provided above directed to RJ-45 connectors, the connector 304 provided by an RJ-45 male connector may disengage the connector 204a provided by an RJ-45 female connector by moving that RJ-45 male connector out of the RJ-45 female connector. However, while a specific example has been provided, one of skill in the art in possession of the present disclosure will recognize that a variety of different types of connectors may be disengaged using a variety of techniques that will fall within the scope of the present disclosure as well. As will be appreciated by one of skill in the art in possession of the present disclosure, the removal of the force 702 by the user will allow the resilient members 408 to move the connector release assist actuator 406 back into the first orientation A.

Thus, systems and methods have been described that provide a connector release assist device that assists in actuating a connector feature on a connector when direct access to that connector feature is inhibited. For example, a subsystem may be located adjacent a female connector in a manner that inhibits access to a connector release member on a male connector when that male connector is connected to and secured in the female connector. In such situations, the connector release assist device may be provided adjacent that female connector such that a user engagement portion of a connector release assist actuator is accessible to a user, and the user may provide a force on that user engagement portion to activate the connector release assist device and move a connector release member engagement portion of the connector release assist actuator into engagement with the connector release member to actuate the connector release member and disengage at least one securing feature that secures the male connector to the female connector. The disengagement of the at least one securing feature allows the male connector to be removed from the female connector. As such, systems with subsystems that inhibit access to connector features may be provided with the connector release assist device of the present disclosure in order to allow a user the ability to utilize that connector feature easily and quickly.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A connector release assist system, comprising:
   a first connector that has at least one first connector securing feature that is configured to:
      engage a second connector to secure the second connector to the first connector; and
      disengage the second connector when a second connector release member on the second connector is actuated;
   a subsystem that is located adjacent the first connector such that the subsystem inhibits access to the second connector release member when the second connector is secured to the first connector; and
   a connector release assist device that is located adjacent the first connector and that extends past the subsystem, wherein the connector release assist device includes:
      a connector release assist base; and
      a connector release assist actuator that includes:
         a user engagement portion;
         a connector release member engagement portion; and
         an elongated extender portion that connects the user engagement portion to the connector release member engagement portion, that is moveably coupled to the connector release assist base, and that is configured to move, when the user engagement portion is engaged, the connector release assist actuator between:
            a first orientation that allows the second connector to be positioned in and secured to the first connector; and
            a second orientation that causes the connector release assist actuator to engage and actuate, via the connector release member engagement portion, the second connector release member when the second connector is secured to the first connector,
         wherein the user engagement portion is orientated at an angle of less than 180 degrees with respect to the elongated extender portion, and the connector release member engagement portion is orientated an at angle of greater than 180 degrees with respect to the elongated extender portion.

2. The system of claim 1, wherein the connector release assist device is located between the first connector and the subsystem.

3. The system of claim 1, wherein the connector release assist device includes:
   a resilient member engaging the connector release assist base and the connector release assist actuator to resiliently bias the connector release assist actuator into the first orientation, wherein a force from a user moves the connector release assist actuator into the second orientation.

4. The system of claim 1, wherein the subsystem is a securing latch.

5. The system of claim 1, wherein the first connector is an RJ-45 female connector, and wherein the second connector is an RF-45 male connector.

6. An Information Handling System (IHS), comprising:
   a chassis;
   a processing system that is included in the chassis;
   a first connector that is included on the chassis and coupled to the processing system, wherein the first connector has at least one first connector securing feature that is configured to:

engage a second connector to secure the second connector to the first connector; and disengage the second connector when a second connector release member on the second connector is actuated;

a chassis subsystem that extends from the chassis adjacent the first connector such that the chassis subsystem inhibits access to the second connector release member when the second connector is secured to the first connector; and a connector release assist device that is located on the chassis adjacent the first connector and that extends past the chassis subsystem, wherein the connector release assist device includes:

a connector release assist base; and a connector release assist actuator that includes:

a user engagement portion;

a connector release member engagement portion; and an elongated extender portion that connects the user engagement portion to the connector release member engagement portion, that is moveably coupled to the connector release assist base, and that is configured to move, when the user engagement portion is engaged, the connector release assist actuator between:

a first orientation that allows the second connector to be positioned in and secured to the first connector; and a second orientation that causes the connector release assist actuator to engage and actuate, via the connector release member engagement portion, the second connector release member when the second connector is secured to the first connector, wherein the user engagement portion is orientated at an angle of less than 180 degrees with respect to the elongated extender portion, and the connector release member engagement portion is orientated an at angle of greater than 180 degrees with respect to the elongated extender portion.

7. The IHS of claim 6, wherein the connector release assist device is located on the chassis between the first connector and the chassis subsystem.

8. The IHS of claim 6, wherein the connector release assist device includes:

a resilient member engaging the connector release assist base and the connector release assist actuator to resiliently bias the connector release assist actuator into the first orientation, wherein a force from a user moves the connector release assist actuator into the second orientation.

9. The IHS of claim 6, wherein the chassis subsystem is a computing device chassis securing latch.

10. The IHS of claim 6, wherein the first connector is a female connector, and wherein the second connector is a male connector.

11. The IHS of claim 6, wherein each of the first connector and the second connector are RJ-45 connectors.

12. A method for assisting the release of a connector, comprising:

engaging a first connector with a second connector;

securing the second connector in the first connector via the engagement of the second connector by at least one first connector securing feature on the first connector, wherein a subsystem that is located adjacent the first connector inhibits access to a second connector release member on the second connector when the second connector is secured to the first connector;

activating a connector release assist device that is located adjacent the first connector and that extends past the subsystem, wherein the activation of the connector release assist device actuates the second connector release member to disengage the second connector from the at least one first connector securing feature, and wherein the connector release assist device includes:

a connector release assist base; and a connector release assist actuator that includes:

a user engagement portion;

a connector release member engagement portion; and an elongated extender portion that connects the user engagement portion to the connector release member engagement portion, that is moveably coupled to the connector release assist base, and that is configured to move, when the user engagement portion is engaged during the activation of the connector release assist device, the connector release assist actuator between:

a first orientation that allows the second connector to be positioned in and secured to the first connector; and a second orientation that causes the connector release assist actuator to engage and actuate, via the connector release member engagement portion, the second connector release member when the second connector is secured to the first connector, wherein the user engagement portion is orientated at an angle of less than 180 degrees with respect to the elongated extender portion, and the connector release member engagement portion is orientated an at angle of greater than 180 degrees with respect to the elongated extender portion; and disengaging the second connector and the first connector.

13. The method of claim 12, wherein the connector release assist device is located between the first connector and the subsystem.

14. The method of claim 12, further comprising:

resiliently biasing, using a resilient member engaging the connector release assist base and the connector release assist actuator, the connector release assist actuator into the first orientation, wherein a force from a user moves the connector release assist actuator into the second orientation.

15. The method of claim 12, wherein the subsystem is a securing latch.

16. The method of claim 12, wherein the first connector is a female connector, and wherein the second connector is a male connector.

17. The method of claim 12, wherein each of the first connector and the second connector are RJ-45 connectors.

* * * * *